M. B. KING.
COTTON CHOPPER.
APPLICATION FILED APR. 19, 1919.
1,371,099.
Patented Mar. 8, 1921.
2 SHEETS—SHEET 1.
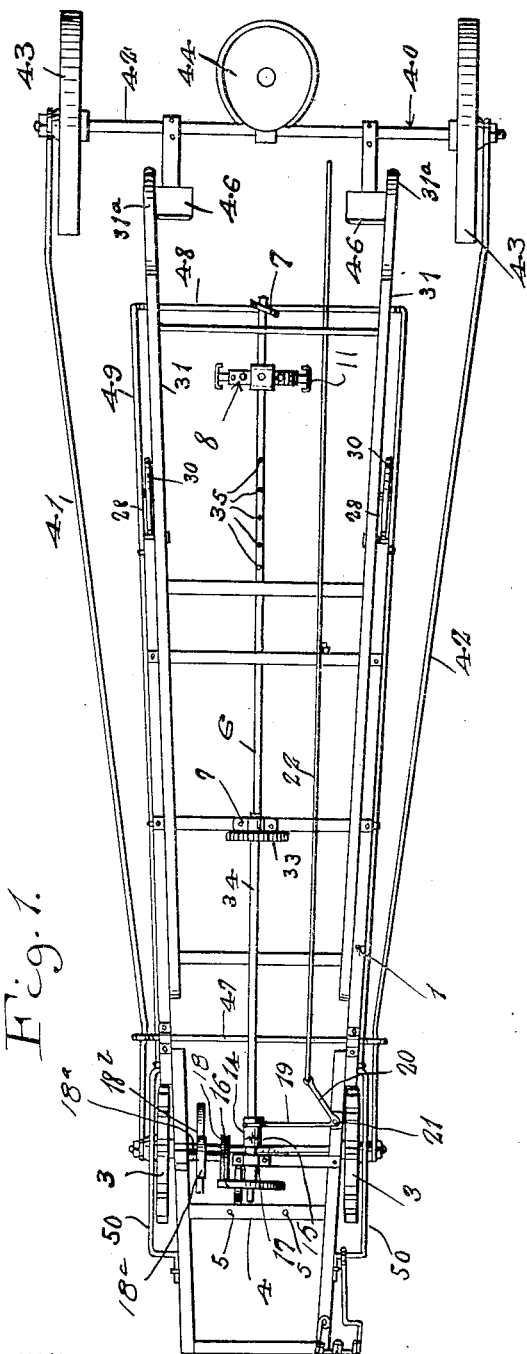
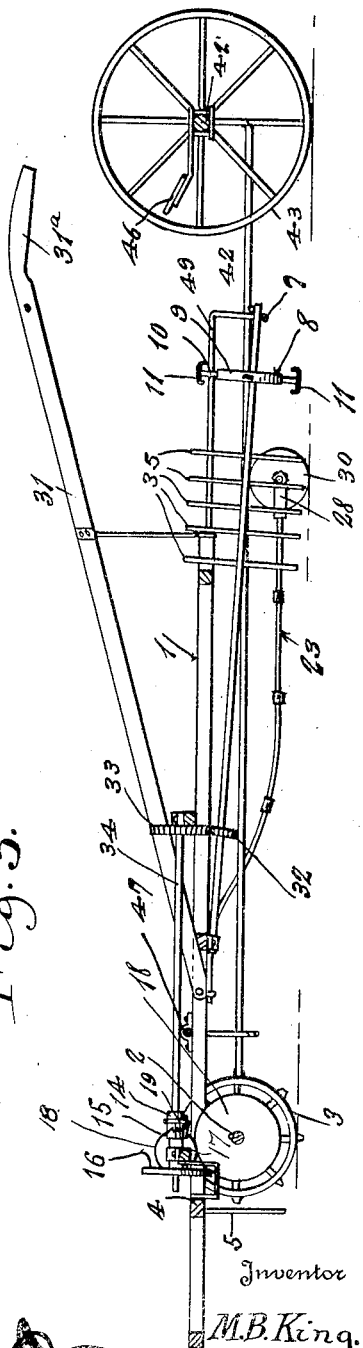
Inventor
M. B. King.

M. B. KING.
COTTON CHOPPER.
APPLICATION FILED APR. 19, 1919.
1,371,099.
Patented Mar. 8, 1921.
2 SHEETS—SHEET 2.
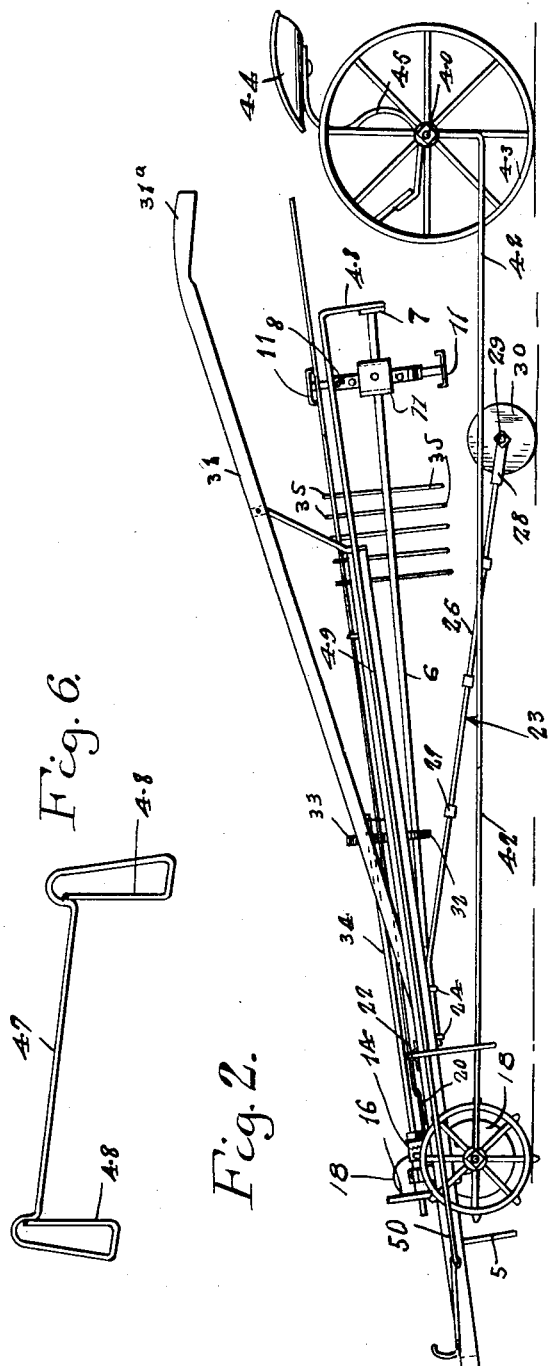
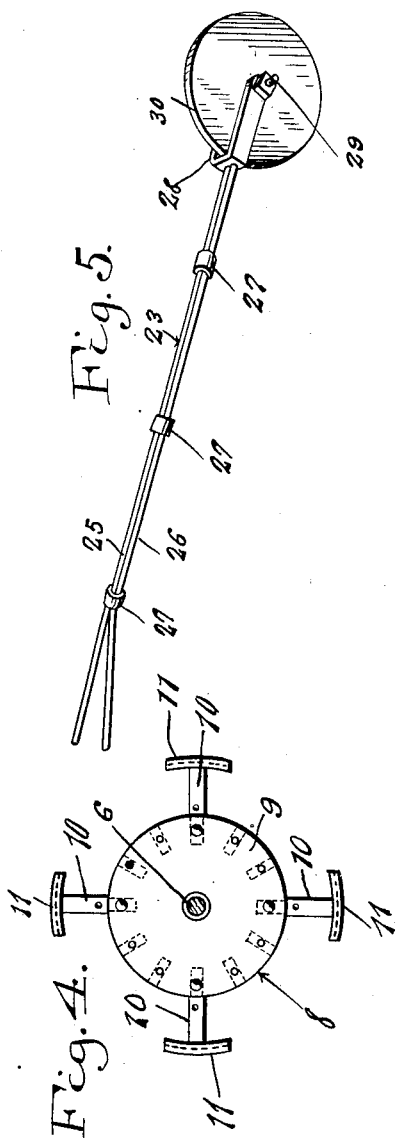
Inventor
M. B. King.

UNITED STATES PATENT OFFICE.

MYATH B. KING, OF CORINTH, MISSISSIPPI.

COTTON-CHOPPER.

1,371,099.

Specification of Letters Patent.   Patented Mar. 8, 1921.

Application filed April 19, 1919.   Serial No. 291,321.

*To all whom it may concern:*

Be it known that I, MYATH B. KING, a citizen of the United States, residing at Corinth, in the county of Alcorn and State of Mississippi, have invented certain new and useful Improvements in Cotton-Choppers; and I do hereby declare the following to be a full, clear, and exact description of the invention, such as will enable others skilled in the art to which it appertains to make and use the same.

This invention relates to cotton choppers and the primary object of the invention is to provide a cotton chopper which includes a supporting frame having a pair of spring or resilient standards attached adjacent to the forward end of the same and extending rearwardly, which standards have relatively small supporting wheels mounted upon their rear free ends, whereby the resiliency of the standards will normally hold the rotary chopping element out of an operative position and further to provide handles which are carried by the supporting frame, so that when the operator of the device presses downwardly upon the handles, the downward pressure will overcome the upward pressure of the resilient standards and move the rotary chopping elements into a cotton chopping position. In this manner, the vertical adjustment of the rotary chopping elements may be easily controlled, by the operator of the device.

A further object of this invention is to provide a truck structure which is attached to the forward end of the supporting structure of the chopper by means of a pair of brace rods that are connected to the end of the axle of the truck structure and extend alongside the main supporting frame of the chopper for positioning the truck structure rearwardly of the supporting frame of the chopper so that the operator seated upon the truck structure may conveniently reach and move the handles which are carried by the supporting structure.

A still further object of this invention is to provide a chopping element which is mounted upon a rotatable shaft which extends longitudinally of the main supporting frame of the chopper and which is rotated through the medium of friction gears, by the rotation of the front or main supporting axle of the chopper structure.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which—

Figure 1 is a top plan view of the improved cotton chopper,

Fig. 2 is a side elevation of the improved cotton chopper showing the chopping element in an inoperative position, Fig. 3 is a longitudinal section through the chopper showing the chopping element in a depressed or operative position, Fig. 4 is a sectional view through a fragment of the chopper showing the chopping element in front elevation, Fig. 5 is a detail perspective view of one of the spring standards, and Fig. 6 is a detail perspective view of a part of the structure which supports the truck brace bars.

Referring more particularly to the drawings, 1 designates the main supporting frame of the cotton chopper which has a supporting axle 2 carried thereby and attached thereto in any suitable manner, upon which axle the usual type of supporting wheels 3 are mounted. The frame 1 project forwardly of the axle 2 and it has a cross bar 4 carried thereby from which a plurality of tines 5 depend. The tines 5 are provided for breaking down stalks of matured or dead plants which might be standing in the field from which the cotton plants are being thinned.

The supporting frame 1 has a shaft 6 rotatably carried thereby and supported by suitable bearings 7. The shaft 6 extends longitudinally of the center of the supporting frame 1 and it has a rotary chopping structure generically indicated by the numeral 8 mounted upon its rear end. The chopping structure 8 comprises a circular body 9 which has a plurality of radiating arms 10 formed thereupon, on the outer ends of which are mounted the hoe or cutting blades 11. The cutting blades 11 are sharpened for cutting or chopping out certain cotton plants during the operation of the chopper.

The shaft 6 has a clutch section 14 mounted upon its forward end which is adapted for coaction with a clutch section 15 carried by one face of a friction disk 16. The friction disk 16 is rotatably supported by suitable bearings 17 and it coacts with a second friction disk 18 which is mounted on a shaft 18ª. The shaft is rotated by the axle 2 through gears 18ᵇ and 18ᶜ. The gears 16, 18, 18ᵇ and 18ᶜ are inclosed in a suitable casing, not shown.

The clutch section 14 has the forked arm 19 of a bell crank lever 20 connected thereto. The bell crank lever 20 is pivotally connected at 21, and it has a rod 22 connected thereto which extends rearwardly along the supporting frame to the rear end of the same so that the operator of the device, may, by moving the rod 22 longitudinally shift the clutch section 14 into or out of operative engagement with the clutch section 15.

The supporting frame 1 has a pair of spring standards 23 connected thereto as shown at 24 adjacent to the forward end of the frame and directly in the rear of the axle 2. The standards 24 are constructed of spring or resilient rods, preferably of two rods 25 and 26 which are bound together by suitable collars 27 as clearly shown in Fig. 5 of the drawings. The resilient or spring rods or standards 23 have forked plates or members 28 carried by their lower rear ends which support pins 29 upon which are rotatably mounted supporting wheels 30. The supporting wheels 30 engage the ground and when there is no downward pressure upon the handles 31, which are attached to the supporting frame 1, the resiliency of the standards 23 will force the rear end of the supporting frame 1 upwardly, and consequently elevate the chopping structure 8 into an inoperative position as illustrated in Fig. 2 of the drawings, while when the operator of the device presses downwardly upon the handles 31, the resiliency of the standards 23 will be overcome and the chopping element 8 will be moved into operative ground engaging position, as illustrated in Fig. 3 of the drawings.

The shaft 6 has a gear 32 connected thereto which meshes with a gear 33. The gear 33 is carried by the shaft 34 upon which the friction disk 16 is mounted.

The handles 31 are of the usual construction employed in agricultural implements, being provided with hand grips 31ª.

The shaft 6 has a plurality of radiating tines or fingers 35 extending diametrically therethrough which are provided for stirring up the ground about the cotton plants which are being treated by the chopper structure, so as to effectively cultivate the plants, at the same time a certain number of them are cut out for thinning the stand of plants.

The cotton chopper has a truck structure generically indicated by the numeral 40 detachably connected to the main supporting frame, through the medium of a pair of rods 41 and 42. The rods 41 and 42 have their forward ends detachably connected to the front axle 2, while the rear ends of the rods are detachably connected to the axle 42′ of the truck structure 40. The axle 42′ of the truck structure 40 has supporting wheels 43 of the usual type rotatably mounted thereupon and it has a seat 44 of the usual construction employed in agricultural implements, suspended thereabove by the usual type of resilient or spring standard 45, which standard is attached to the axle 42′ in any suitable manner. The axle 42′ also has a foot rest 46 attached thereto and positioned for supporting the feet of the operator of the device who may be seated upon the seat 44. A rod 47 is carried by the supporting frame 1 and it has substantially rectangularly shaped right angularly extending portions 48′ formed upon its end, which substantially rectangular portions are formed by bending the wire into substantially rectangular shape, to form guides which extend over the rods 41 and 42 for supporting the rods and limiting their vertical movement.

When the improved cotton chopper is being transported from one place to another, the operator of the machine removes his hands from the handles 31 or does not press downwardly upon the handles which allows the resilient or spring action of the standard 23 to force the rear end of the main supporting structure of the cotton chopper upwardly for positioning the chopping element 8 and the cultivating tines 35 out of ground engaging position, as shown in Fig. 2 of the drawings and when it is desired to cultivate the cotton and chop out certain plants of the same, the operator presses downwardly upon the handles 31 which pressure overcomes the resiliency of the standard 23 and moves the chopping and cultivating element into operative position. By slightly increasing or decreasing the pressure upon the handles 31ª, the elevation of the chopping element 8 and the cultivating tines 35 may be regulated to compensate for undulation in the surface over which the chopper is traveling.

The bearing 7 in which the rear end of the shaft 6 is rotatably mounted is supported by a depending rear end 48 of an auxiliary supporting frame 49. The auxiliary supporting frame 49 is constructed of a metal rod, or analogous structure and its sides extend along the sides of the main supporting frame 1, being bent outwardly as shown at 50 to form guards which extend about the main supporting wheels 3.

In reducing the invention to practice, certain minor features of construction, combination and arrangement of parts may necessitate alterations to which the patentee is entitled provided such alterations are comprehended within the scope of what is claimed.

What is claimed is:—

In a cotton chopper structure, a supporting frame, a cotton chopping element carried by said supporting frame, a pair of resilient standards carried by said supporting frame, supporting wheels mounted upon said resilient standards, the resiliency of said standards normally holding said chopping element out of an operative ground engaging position, a front axle carried by the forward end of said supporting structure, supporting wheels mounted upon said front axle, means rotated by the rotation of said front axle for rotating said chopping element, and means for arresting rotation of said chopping element by the rotation of said axle.

In testimony whereof I affix my signature in presence of two witnesses.

MYATH B. KING.

Witnesses:
J. C. DANIEL,
J. M. BEW.